April 30, 1946. P. S. JACKSON 2,399,187
FRAME ELEMENT FOR MACHINE TOOLS
Filed Nov. 29, 1943 3 Sheets-Sheet 1

INVENTOR.
Paul S. Jackson.
BY
his Atty.

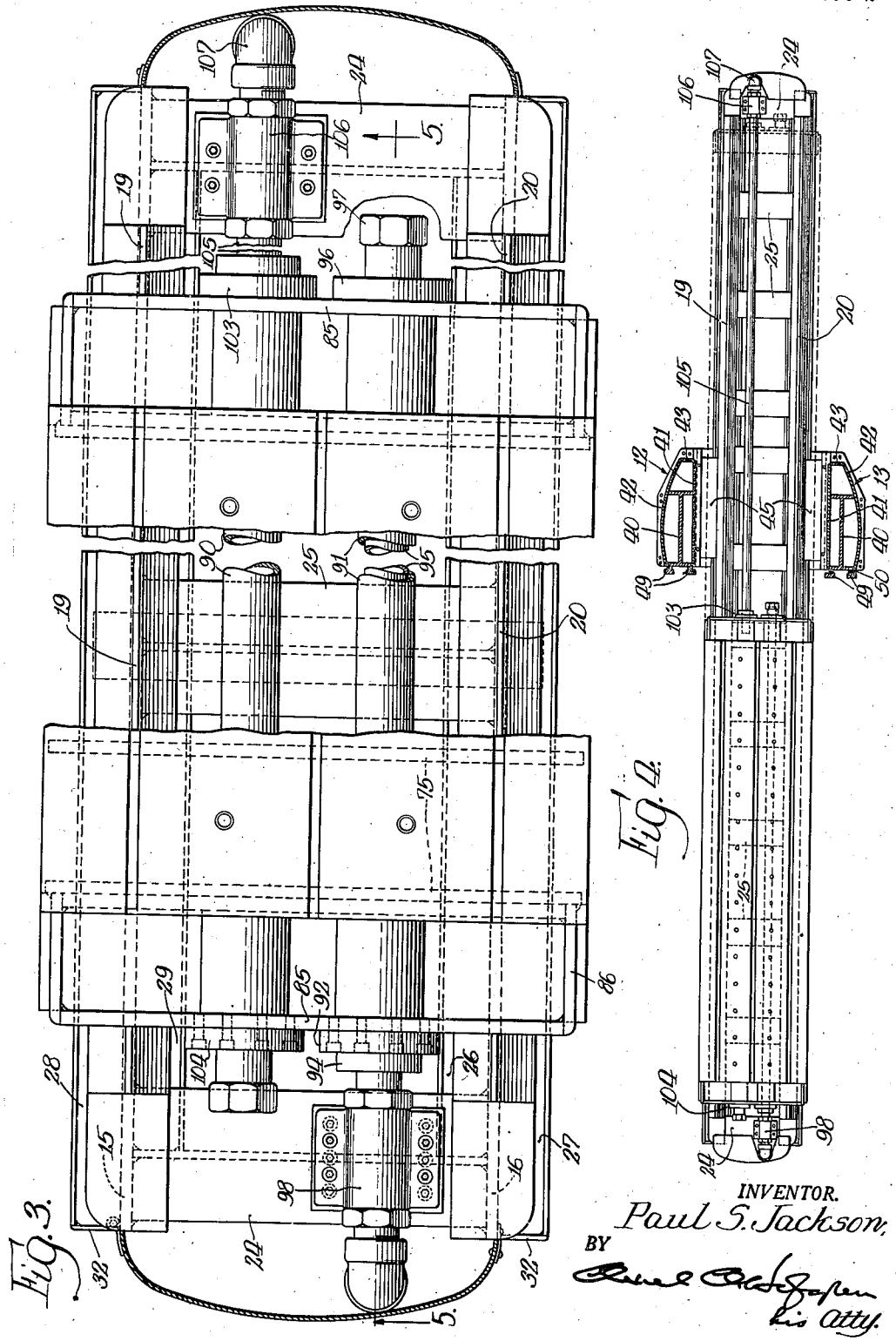

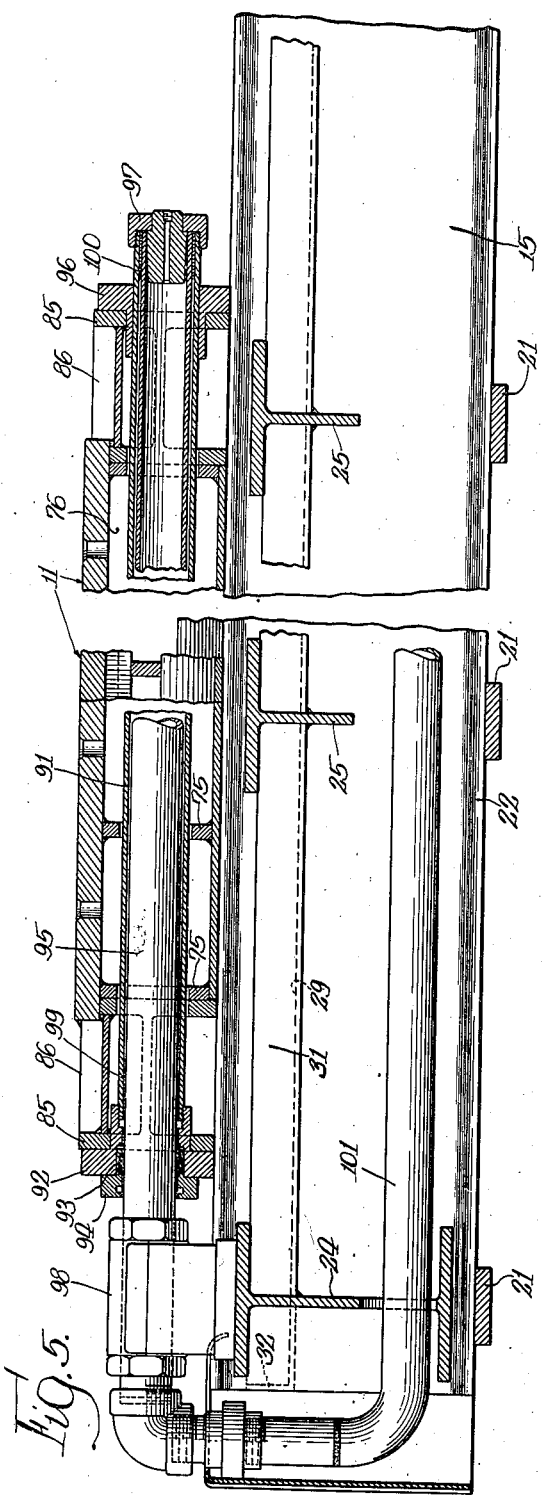

Patented Apr. 30, 1946

2,399,187

UNITED STATES PATENT OFFICE 2,399,187

FRAME ELEMENT FOR MACHINE TOOLS

Paul S. Jackson, Rockford, Ill., assignor to Jackson Hydraulic Machine Co., Inc., Rockford, Ill., a corporation of Illinois Application November 29, 1943, Serial No. 512,154

12 Claims. (Cl. 90—58)

The invention relates to frame elements for machine tools, and has for its general object the construction of machine tool frame elements from standard steel structural shapes, such as I-beams, channels, angles, plates, etc.

Another object is to provide for a machine tool as, for example, a planer, a new and improved bed and table construction embodying standard steel shapes cut to appropriate size and welded together, thereby facilitating construction without the use of the patterns ordinarily required for castings.

Another object is to provide a bed and table construction for metal cutting planers embodying a pair of longitudinally extending, parallel and laterally spaced structural members and a plurality of transversely extending members welded thereto to form a rigid integral structure with external features simulating those of cast structures.

Other objects will become readily apparent from the following detailed description taken in connection with the accompanying drawings in which:

Fig. 3 is a fragmentary plan view of the bed and table construction of Fig. 1.

Fig. 4 is a full length plan view of the planer bed and table on a small scale, with the columns shown in section as indicated at line 4—4 of Fig. 1.

Fig. 5 is a fragmentary longitudinal vertical section through the bed and table approximately along the line 5—5 of Fig. 3.

Fig. 6 is an enlarged fragmentary, vertical section through one of the table and bed ways at the mid-portion thereof.

Fig. 7 is a fragmentary section along the line 7—7 of Fig. 6.

Figures 1, 2:
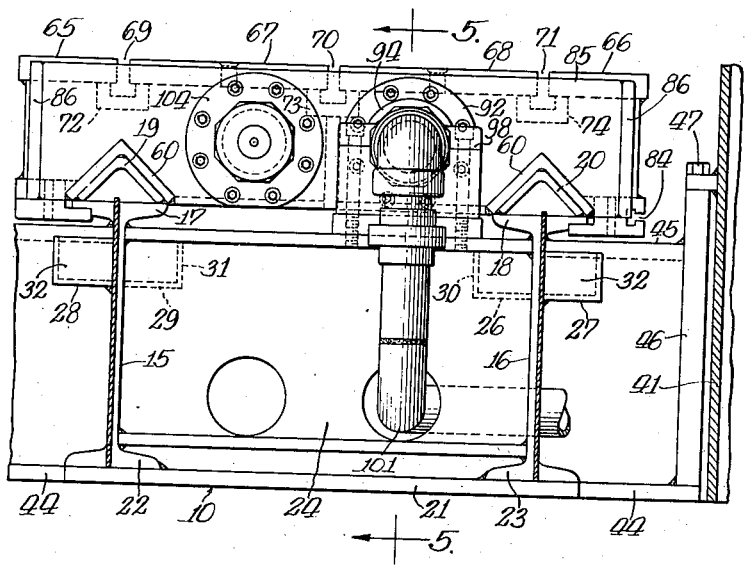
Fig. 1 is a fragmentary transverse vertical section through a planer bed and table, with one column shown in elevation.
Fig. 2 is an end elevation of the bed and table shown in Fig. 1, and looking in the same direction.

Although, for purposes of disclosure, the invention is illustrated as embodied in a metal working planer, it is to be understood that the invention is not necessarily limited to such a machine. The scope of the invention will be pointed out in the appended claims.

As shown in the drawings, the invention is embodied in a planer having a bed 10, a table 11 and columns 12 and 13 (Fig. 4) which are intended to support a cross rail and tool supports in the manner disclosed in my copending application Serial No. 510,092, filed November 13, 1943.

The bed 10 comprises a pair of laterally spaced, longitudinally extending and parallel I-beams 15 and 16. On the upper flanges 17 and 18 of these I-beams are secured, by welding along their edges, angles 19 and 20 in position to form inverted V-ways. The I-beams 15 and 16 are supported on a plurality of metal cross plates 21 which are welded to the lower flanges 22 and 23 of the I-beams. Completing the general structure of the bed are a pair of transversely extending wide-flange I-beams 24, one at each end of the bed, and a plurality of T-shaped members 25. For convenience, the T-shaped members may be wide-flange I-beams, such as 24, cut in half along the center of the web so that each I-beam forms two T-shaped sections. These cross members are all securely welded to the I-beams 15 and 16 along adjoining edges, so as to form a rigid, integral structure.

In order to form collecting troughs for oil dripping from the V-ways of the bed, angle members 26 and 27 are welded to the I-beam 16 adjacent the upper end of its web, and, similarly, angle members 28 and 29 are welded to the web of the I-beam 15. The cross members 25 are suitably cut away, as at 30 and 31 in Fig. 1, to permit the angle members 26 and 29 to run continuously throughout the length of the bed. The angle members 26 and 29 terminate at the webs of the cross members 24, while the angle members 27 and 28 are slightly longer and are preferably provided with end walls, as indicated at 32 (Fig. 3); the troughs also have suitable connections to the lubricating oil pumping and filtering means (not shown) through which the collected oil passes before being re-used.

Filtered oil under pressure is preferably supplied to the longitudinally extending ducts 33 and 34, formed between the angle members 19 and 20 and the upper flanges 17 and 18 of the I-beams. As shown in Fig. 6, ports 35 and 36 are provided in each of the angle members so as to permit the oil to pass to the outer surfaces thereof. These outer surfaces are provided with grooves 38, as shown in Fig. 7, extending in both directions from the ports 35 and 36 so as to facilitate distribution of the oil on the guide surfaces provided by the angle members.

The frame of the machine includes the vertically extending columns 12 and 13 hereinbefore referred to. As shown in Fig. 4, each column comprises a vertically extending I-beam 40, a wide, flat plate 41, a wide, curved plate 42 and a narrow plate 43, all rigidly secured together by welding along their adjoining edges. The columns are secured to the bed, as shown in Figs. 1 and 2, by means of horizontal plates 44 and 45 which are welded to the flanges of the I-beams 15 and 16. At their outer ends the plates 44 and 45 are welded to a vertically extending plate 46 to which the column is secured, as by bolt devices 47. One face of the column, as illustrated, has ways for a cross rail formed thereon by narrow metal plates 49, and even narrower metal plates 50, welded together and onto the outer flange of the I-beam 40, as best shown in Fig. 4.

The table 11, in the form herein illustrated, comprises longitudinally extending and laterally spaced, parallel angle members 60 positioned to provide inverted V-ways cooperating with the guideways formed by the angle members 19 and 20 on the bed. The lower portion of the table includes longitudinally extending metal plates 61 and 62 outside of the angle members, and thinner plates 63 and 64 inwardly of the angle members. The upper surface of the table is formed by narrow plate members 65 and 66 along the side edges of the table and intermediate plate members 67 and 68, all spaced apart to provide slots 69, 70 and 71 therebetween. Upwardly open channel members 72, 73 and 74 have their flanges welded to the under marginal surfaces of the top plate members of the table, as shown in Fig. 1, so as to provide spaces connecting with the slots 69, 70 and 71 to form T-slots. A plurality of transversely extending webs 75 are cut to shape and fitted in between the upper and lower plates of the table, and are welded in place by welding seams running along the adjoining edges of the parts. The transversely extending web members 75 extend all the way across the table. Intermediate these members and along the center line of the table are provided short web members 76 which are welded at their lower edges to the plates 63 and 64, along their upper edges to the channel 73, and along their ends to the transverse web members 75.

Preferably, the table is gibbed to the bed. As shown herein, this is accomplished by forming a way 80 on the upper flange 17 of the I-beam 15 and a corresponding way 81 on the I-beam 16. A gib 82 extends the length of the table, along its left-hand edge, and cooperates with a way 80 to hold the table on the bed. A similar gib 83 is secured along the right-hand edge of the table. This gib, as well as the plate 62 of the table, are preferably grooved to provide a T-slot 84 for supporting control dogs.

At each end of the table there is positioned a transversely extending H-beam 85, as shown in Fig. 3. The ends of these H-beams are closed by means of plates 86, and one flange of each beam 85 constitutes an end plate of the table.

In addition to forming frame elements of machine tools from structural shapes welded together, as illustrated in the bed and table constructions heretofore described, the invention contemplates the forming of other portions of machine tools from standard metal shapes. This principle of the invention is also exemplified in the hydraulic piston and cylinder devices for reciprocating the table 11.

As shown in the drawings, the table 11 carries a pair of laterally spaced and longitudinally extending steel tubes forming cylinders 90 and 91. Cylinder 91 is anchored to the left-hand end of the table (Figs. 3, 4 and 5) by means of a bushing 92 which is screw-threaded to the tube and has a flange abutting the outer flange of the H-beam 85 which forms the end plate of the table.

Suitable packing means 93 and a packing nut 94 are provided for sealing the cylinder around a hollow piston rod 95 which extends into the cylinder. The right-hand end of the cylinder has a sliding fit in a bushing 96 carried on the right-hand end plate 85 of the table so as to allow for longitudinal expansion and contraction of the cylinder due to temperature changes during operation. The cylinder 91 carries an end cap 97 closing the right-hand end thereof. The hollow piston rod 95 is anchored at its left-hand end in a bracket device 98 rigidly secured to the bed of the machine. The exterior surface of the rod 95 is preferably ground, or otherwise finished, and slides in a bronze bushing 99 secured in the left-hand end of the cylinder 91. A similar bronze bushing 100 is secured to the inner end of the rod 95 and slides in the cylinder 91.

In actuating the table, fluid (preferably oil), under suitable pressure and in suitable volume, is supplied through a tube 101 which connects to the left-hand end of the piston rod 95, the fluid passing through the hollow rod 95 and against the closed end 97 of the cylinder. The pressure of the fluid exerted on the cylinder moves the table 11 toward the right-hand end of the machine, as it is shown in Figs. 4 and 5. The bushing 100 preferably has longitudinally extending grooves therein (not shown) so that the oil can flow freely therethrough and into the space between the cylinder 91 and the hollow rod 95.

The cylinder 90 is similar to the cylinder 91 and is similarly supported at its ends, but in reversed position, so that its right-hand end (Fig. 4) is anchored to the table by means of a bushing 103, and its left-hand end has a sliding fit in a bushing 104 at the left-hand end of the table. A hollow piston rod 105 cooperates with the cylinder 90 to form a piston and cylinder device, the rod 105 being anchored at its right-hand end in a bracket 106 mounted at the right-hand end of the bed. A tube 107 is arranged to supply fluid to the cylinder 90 and to exhaust it therefrom.

The construction herein disclosed permits the use of standard sized steel tubing for the cylinders 90 and 91 and the piston rods 95 and 105. The rods 95 and 105 are preferably given a smooth finish on their exterior surfaces so as to provide a suitable sliding fit in the packing bushings 92 and 103.

The use of standard steel shapes in the manner herein disclosed, to construct frame elements and other parts of machine tools, permits of the manufacture of these parts without the need for making patterns and castings. This results in a much lower cost for the parts, particularly when they are of large size, and only a small number are required. The parts, when finished, have less weight and are substantially stronger than comparable castings. In addition, they may be provided with all of the external features generally used on machine frame elements, such as T-slots, slideways, gibs, etc. The use of angle members to provide inverted V-ways on the bed produces a simple structure with self-contained oil ducts. These inverted V-ways are superior to the usual, upwardly open type because shavings cannot collect to clog them. The downwardly open V-ways of the table formed by the angle members 60, 60 are faced with bronze wear plates 110 as seen in Fig. 6, and these plates may have oil-distributing grooves 112 of sinuous or other suitable outline, as shown in Fig. 7, to receive oil from the ports 35, 36 and grooves 38 and spread it over the bearing areas of the V-ways 19, 20 and the rear plates 110.

I claim as my invention:

1. A planer bed comprising a pair of laterally spaced and longitudinally extending, parallel I-beams, a plurality of I-beams extending transversely of the bed and welded to the webs of the longitudinal I-beams to form a rigid structure, and angle members secured with their edges welded to the upper flanges of the longitudinal I-beams providing inverted V-ways thereon.

2. A planer bed comprising a pair of laterally spaced and longitudinally extending, parallel I-beams, a plurality of I-beams extending transversely of the bed adjacent its ends and welded to the webs of the longitudinal I-beams, a plurality of T-shaped sections extending transversely between the longitudinal I-beams at points spaced therealong intermediate the ends and welded to the webs thereof, and angle members secured with their edges welded to the upper flanges of the longitudinal I-beams providing inverted V-ways thereon and oil ducts between said flanges and the angle members.

3. A planer bed comprising a pair of laterally spaced and longitudinally extending, parallel I-beams, a plurality of I-beams extending transversely of the bed adjacent its ends and welded to the webs of the longitudinal I-beams, a plurality of T-shaped sections extending transversely between the longitudinal I-beams at points spaced therealong intermediate the ends and welded to the webs thereof, and angle members secured with their edges welded to the upper flanges of the longitudinal I-beams providing inverted V-ways, said edges of the angle members being substantially sealed onto the I-beam flanges to form oil ducts, and the angle members having oil ports leading from said ducts to the outer surfaces of said members.

4. A planer bed comprising a pair of laterally spaced and longitudinally extending, parallel I-beams, a plurality of cross plates welded to the bottom flanges thereof, a plurality of I-beams extending transversely of the bed adjacent its ends and welded to the webs of the longitudinal I-beams, a plurality of T-shaped sections extending transversely between the longitudinal I-beams and at points spaced therealong intermediate the ends and welded to the webs thereof forming a rigid structure, and longitudinally extending angle members secured with their edges welded to the upper flanges of the longitudinal I-beams providing inverted V-ways thereon, each of said angle members having lubricating oil ports in the mid-portion thereof and cooperating with the upper flange of the I-beam to form an oil duct communicating with said ports.

5. A planer bed comprising a pair of laterally spaced and longitudinally extending, parallel I-beams, a plurality of shaped sections extending transversely between the longitudinal I-beams and at points spaced therealong intermediate their ends and welded to the webs thereof forming a rigid structure, longitudinally extending angle members secured with their edges welded to the upper flanges of the longitudinal I-beams so as to provide inverted V-ways thereon, and means for collecting oil dripping from said V-ways comprising angle members positioned one on each side of each longitudinally extending I-beam and immediately beneath the V-ways, with an edge of each of the angles welded to the web of the I-beam.

6. A planer bed comprising a pair of laterally spaced and longitudinally extending, parallel I-beams, a plurality of cross plates welded to the bottom flanges thereof, a plurality of I-beams extending transversely of the bed adjacent its ends and welded to the webs of the longitudinal I-beams, a plurality of T-shaped sections extending transversely between the longitudinal I-beams and at points spaced therealong intermediate their ends and welded to the webs thereof forming a rigid structure, longitudinally extending angle members secured with their edges welded to the upper flanges of the longitudinal I-beams providing inverted V-ways thereon, and means for collecting oil dripping from said V-ways comprising pairs of angle members positioned one on each side of each longitudinally extending I-beam and immediately beneath the V-ways, with an edge of each of the angles welded to the web of the I-beam, said transverse T-sections having portions cut away to pass said angles.

7. A planer table comprising a plurality of longitudinally extending, laterally spaced narrow top plates forming the top surface of the table with longitudinal slots therein, upwardly open channels welded to said plates, one under each slot, securing the plates together and cooperating with said slots to form T-slots, a plurality of longitudinally extending, laterally spaced bottom plates forming a bottom for said table with longitudinal slots therein, downwardly open angle rails welded along their edges to said bottom plates and bridging the longitudinal slots in the bottom of the table to form downwardly open V-ways therefor, and a plurality of vertically disposed plates welded between said top and bottom plates, spacing them apart and forming a rigid integral structure.

8. A planer table comprising a plurality of longitudinally extending, laterally spaced narrow top plates forming the top surface of the table with longitudinal slots therein, upwardly open channels welded to said plates, one under each slot, securing the plates together and cooperating with said slots to form T-slots, a central longitudinally extending bottom plate spaced below the top plates, a narrow bottom plate extending parallel to each lateral edge of the central bottom plate and spaced laterally therefrom, angle rails welded along their edges to said bottom plates bridging the spaces therebetween and forming downwardly open V-ways, and a plurality of vertically disposed plates welded between the top and bottom plates at intervals in the length of the table.

9. A planer table comprising a plurality of longitudinally extending, laterally spaced narrow top plates forming the top surface of the table with longitudinal slots therein, upwardly open channels welded to said plates, one under each slot, securing the plates together and cooperating with said slots to form T-slots, a plurality of vertically disposed, transversely extending plates with their upper edges welded to the under surfaces of said top plates and formed with downwardly open V-shaped notches in their lower edges, and parallel angle rails extending longitudinally of the table, welded into said notches and forming downwardly open V-ways for the table.

10. In a planer table as defined in claim 9, said vertically disposed plates having upwardly open notches fitting around said channels and additional plates extending longitudinally of the table below the top surface thereof, welded to said transversely extending plates to form a rigid structure.

11. A machine element comprising an assembly of standard rolled members extending longitudinally and transversely with their webs vertically disposed, the ends of certain webs abutting the faces of other webs and being welded thereto along their abutting edges to compose a horizontally extending rigid framework, together with horizontally disposed plates welded to one side of said framework, and angle rails in parallel relation to each other, welded to the opposite side of said framework and extending longitudinally thereof forming V-ways thereon.

12. A machine including a bed unit and a table unit, each comprising an assembly of standard rolled shapes extending longitudinally and transversely with their webs vertically disposed, the ends of certain webs abutting the faces of other webs and being welded thereto at their abutting edges to compose a rigid frame structure, together with plates welded to one face of said frame presenting outwardly exposed flat surfaces at one side of the frame and parallel, longitudinally extending angle rails welded to the opposite side of the frame providing V-ways thereon, the V-ways of the table unit being positioned to register with the V-ways of the bed unit in sliding engagement therewith.

PAUL S. JACKSON.